Jan. 23, 1940.  F. G. LEAVENWORTH  2,187,790
APPARATUS FOR MEASURING INTESTINES
Filed Sept. 23, 1937    5 Sheets-Sheet 1
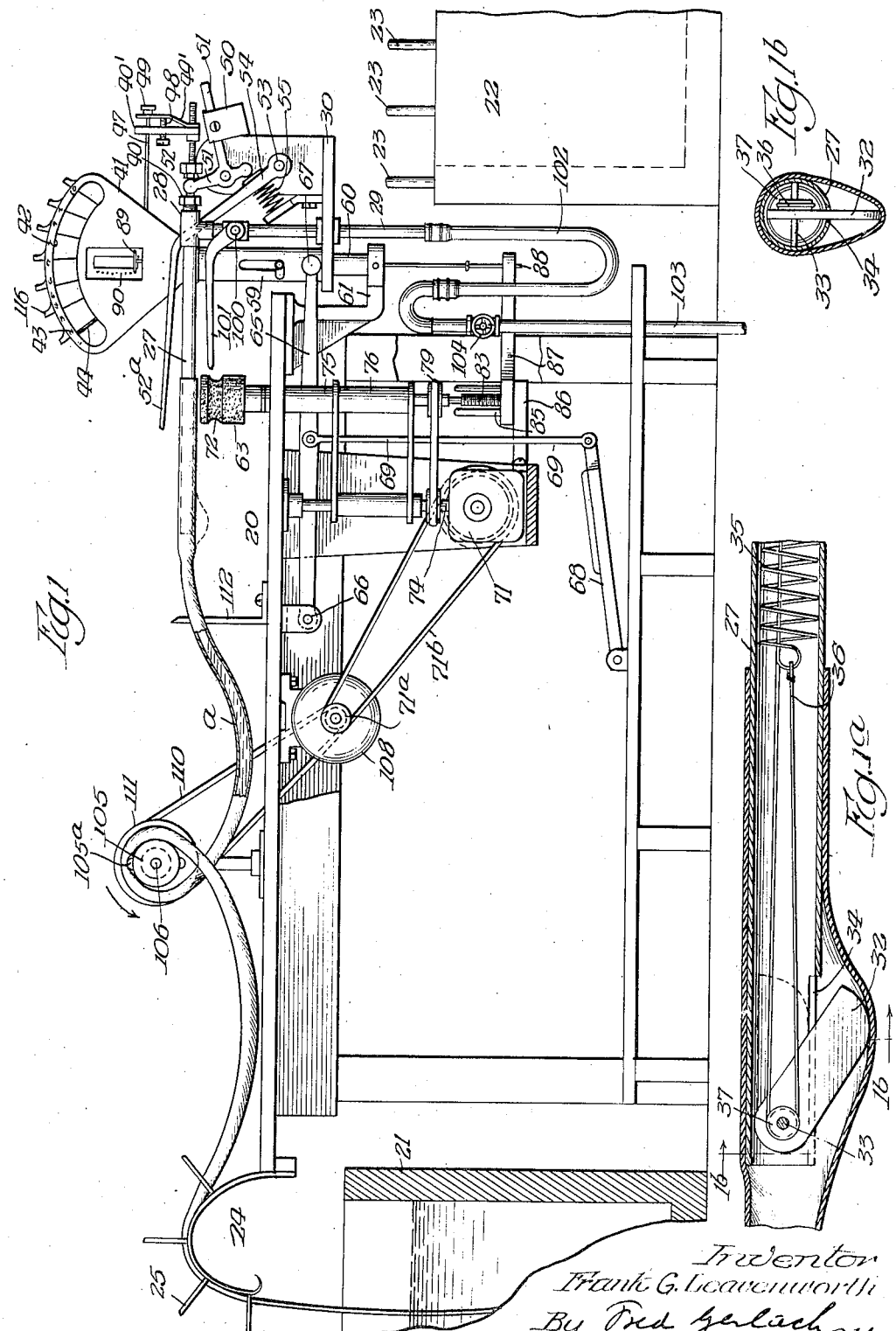
Inventor
Frank G. Leavenworth
By Fred Gerlach
his Atty

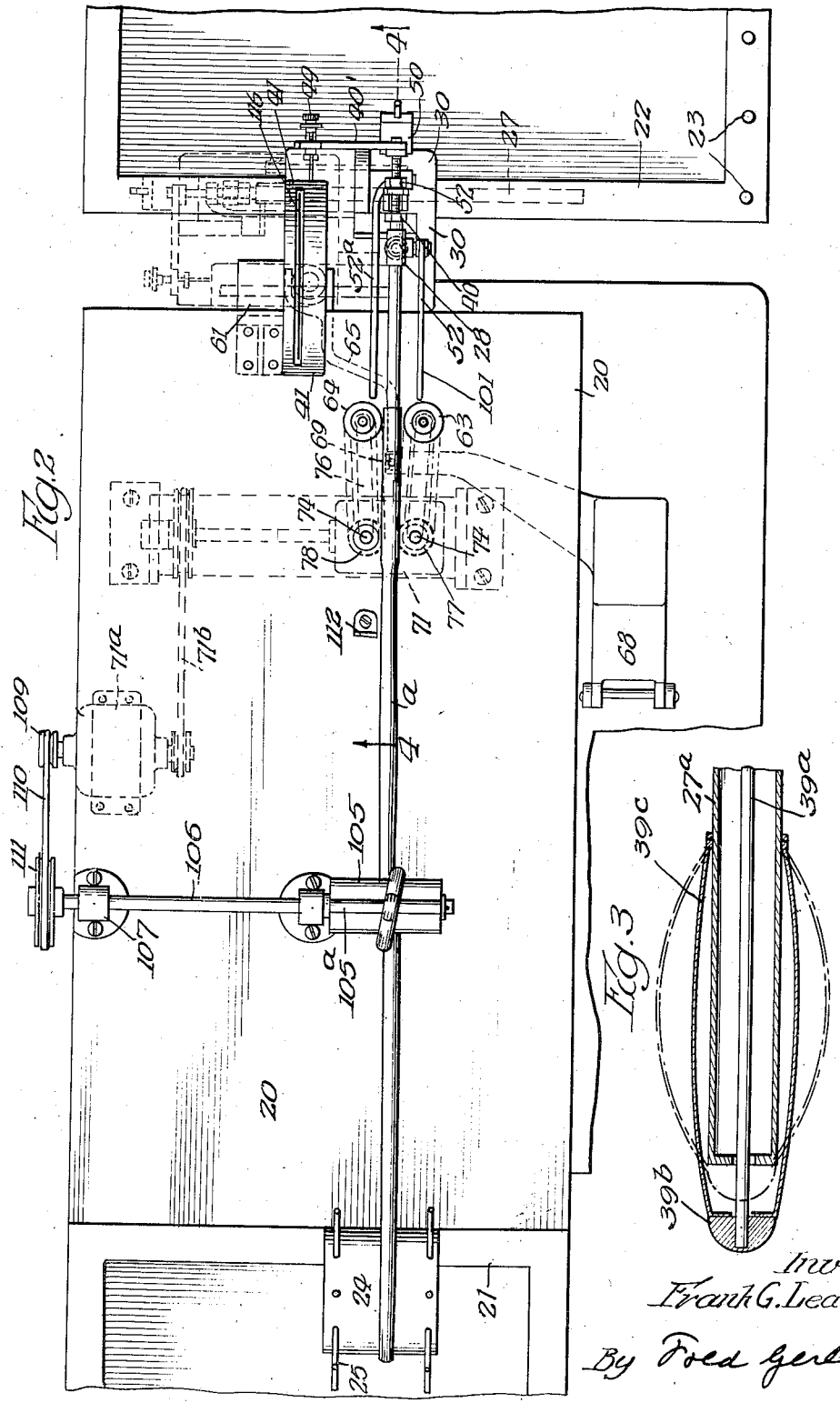

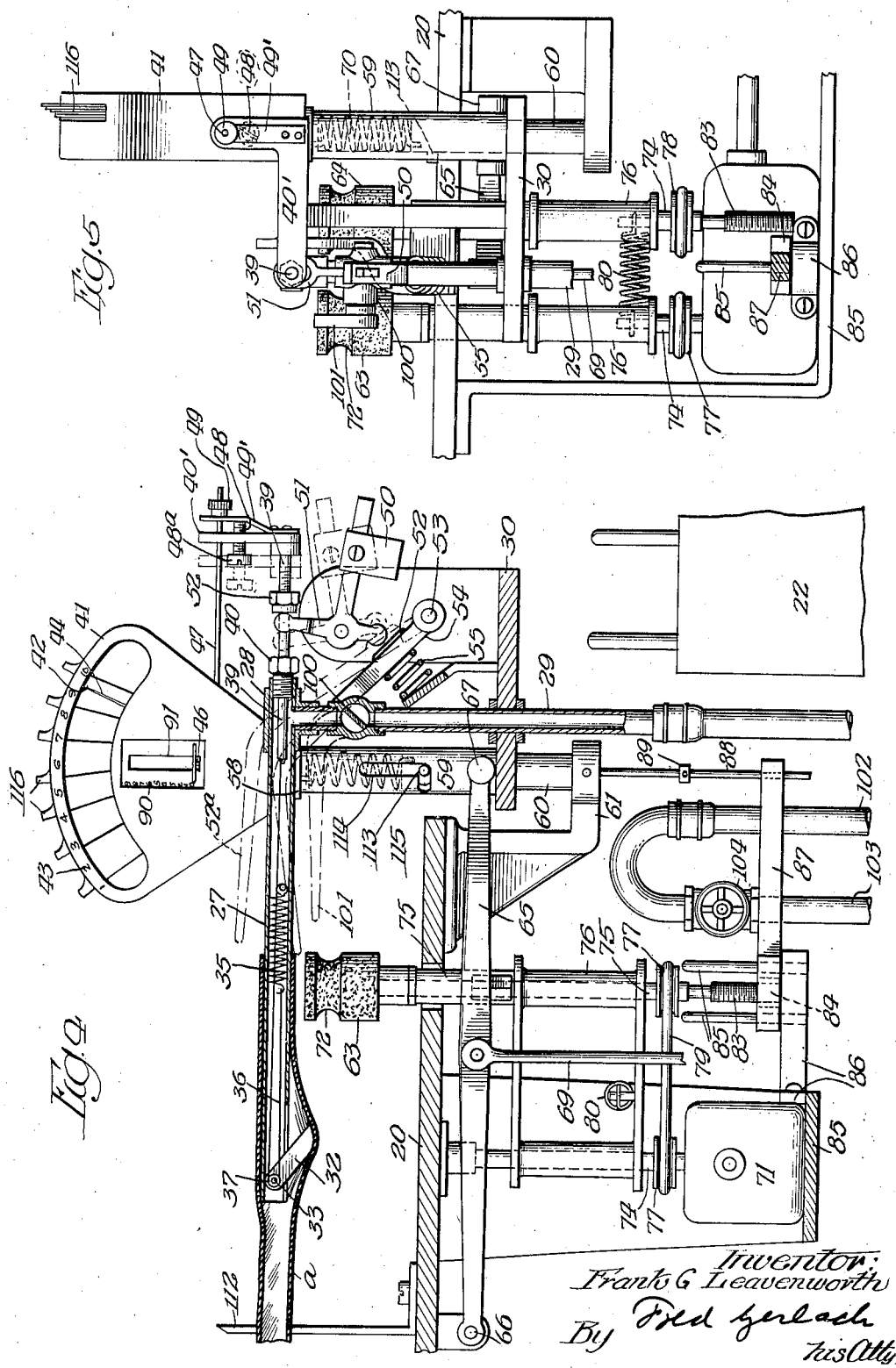

Jan. 23, 1940.　　　F. G. LEAVENWORTH　　　2,187,790
APPARATUS FOR MEASURING INTESTINES
Filed Sept. 23, 1937　　　5 Sheets-Sheet 4
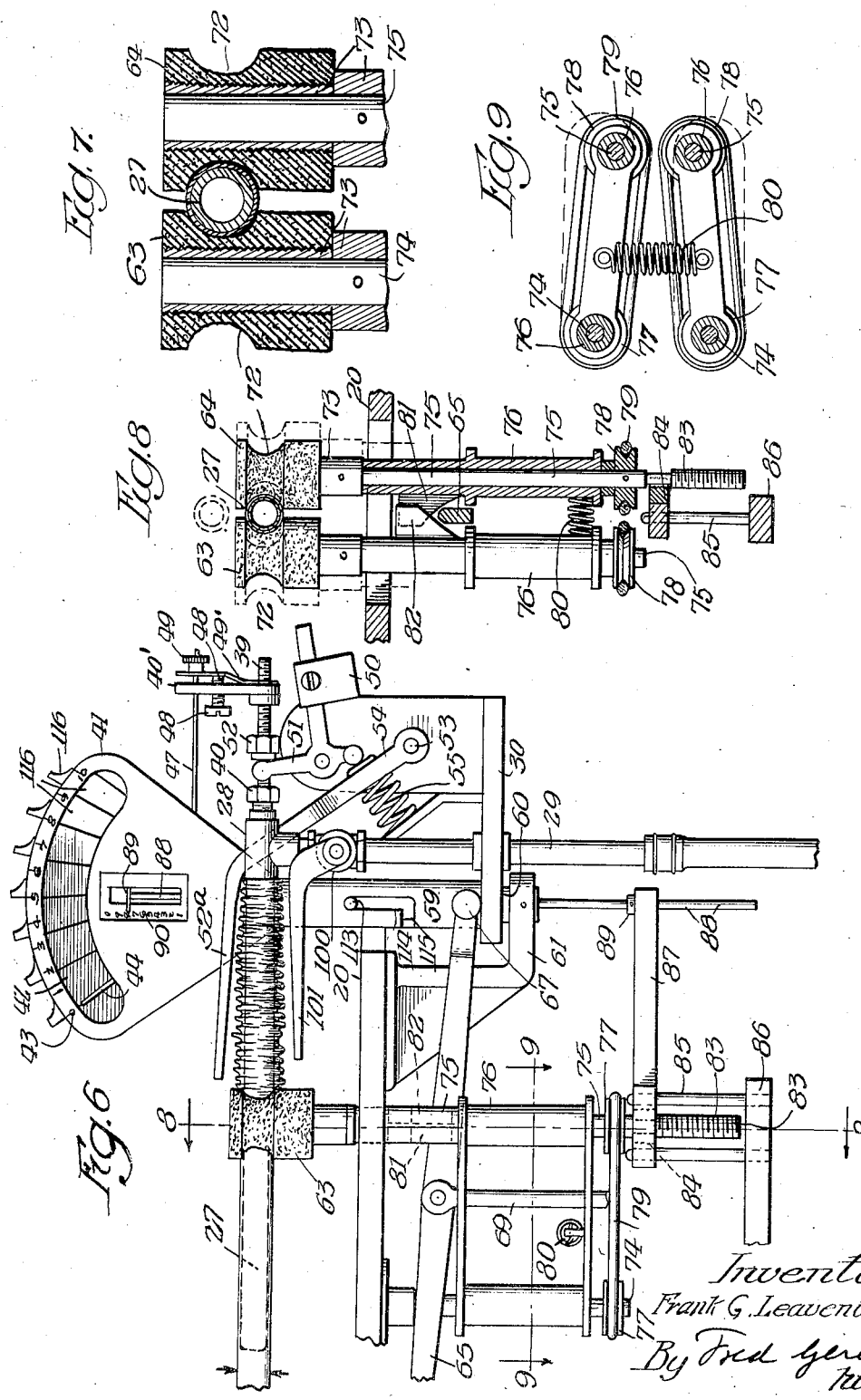

Jan. 23, 1940.  F. G. LEAVENWORTH  2,187,790
APPARATUS FOR MEASURING INTESTINES
Filed Sept. 23, 1937  5 Sheets-Sheet 5
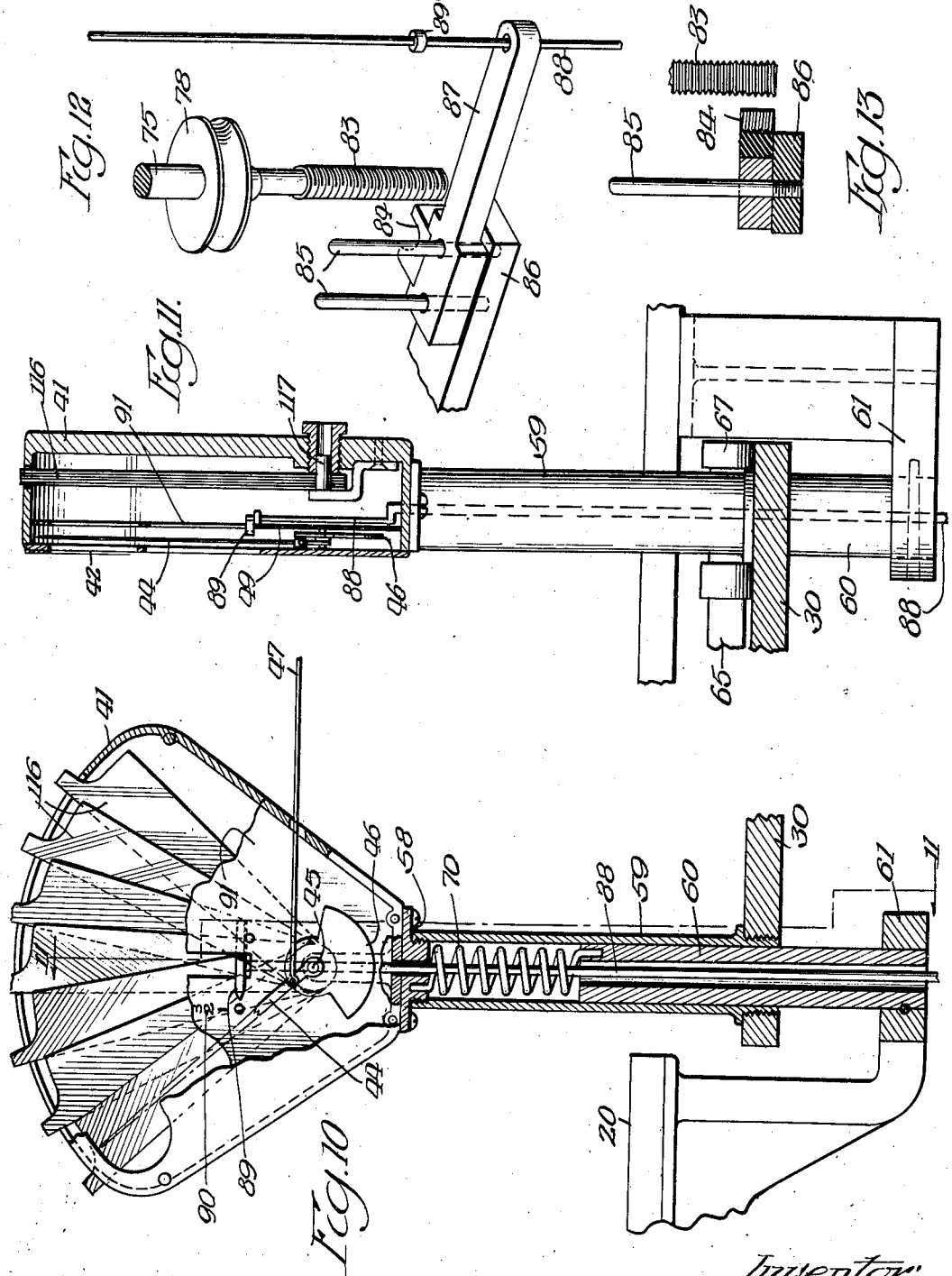
Inventor:-
Frank G. Leavenworth
By Fred Gerlach
his Atty Patented Jan. 23, 1940

2,187,790

UNITED STATES PATENT OFFICE 2,187,790

APPARATUS FOR MEASURING INTESTINES

Frank G. Leavenworth, Oak Park, Ill., assignor, by mesne assignments, to Packers Machinery Company, Chicago, Ill., a corporation Application September 23, 1937, Serial No. 165,329

15 Claims. (Cl. 33—178)

The invention relates to apparatus for measuring and inspecting intestines used for sausage-casings.

In preparing an intestine for use as sausage-casings, the diameter of each casing must be measured so it may be classified according to its diameter. It is also desirable to sever the casing where a substantial change in diameter occurs and to measure and classify the casings or sections thereof according to their length. It is also desirable to inspect the casings while inflated with a liquid, such as water, to locate any defective spots or leaks in it. The apparatus is used for these purposes.

The objects of the invention are to provide improved apparatus which includes: means for masuring and inspecting casings whereby the diameter will be determined from an internal measurement or distension of the casing for accurate determination of the diameter and variations thereof; power-means for stringing the casing onto a core after it has been measured and from which it can be manually stripped for classification according to diameter and length; simple and improved means for measuring the length of casings and sections thereof; improved feed-rolls for advancing a casing on the core which effects a gripping thereof by suction as well as pressure to avoid excessive stressing or tearing of the casing; improved means for guiding the casings so that all portions thereof can be inspected as they are being fed onto the core; simple and efficient diameter-measuring device; improved means for displacing the casing from the feed-table to the receiver for the classified casings; improved means for delivering water into the casing for distending it for inspection; simple apparatus which has a high capacity; and other objects which will appear from the detail description.

The invention consists in the several novel features which are hereinafter set forth and are more particularly defined by claims at the conclusion hereof.

In the drawings: Fig. 1 is a side elevation of an apparatus embodying the invention. Fig. 1ª is a longitudinal section of the device for distending the casing for measurement of its diameter. Fig. 1ᵇ is a section on line 1ᵇ—1ᵇ of Fig. 1ª. Fig. 2 is a plan. Fig. 3 is a longitudinal section of a modified form of internal diameter-measuring device for operating the indicator for the diameter of the casing. Fig. 4 is a longitudinal section on line 4—4 of Fig. 2. Fig. 5 is an end elevation. Fig. 6 is a partial front elevation illustrating the core with an intestine strung thereon and in its lowered position and the feed-rolls operatively engaging the casing. Fig. 7 is a vertical section through the feed-rolls. Fig. 8 is a section on line 8—8 of Fig. 6. Fig. 9 is a section on line 9—9 of Fig. 6. Fig. 10 is a front elevation partly in section of the diameter and length indicators. Fig. 11 is a section on line 11—11 of Fig. 10. Fig. 12 is a perspective of the device for operating the length-indicator. Fig. 13 is a vertical section of the nut and screw for operating the length-indicator.

The invention is exemplified in apparatus including a table 20 on which the measuring and inspecting devices are supported. The casings to be inspected and measured are taken from a tank 21 in which the casings are usually submerged in brine adjacent one end of the table. The inspected and measured intestines are manually placed into a classifying tank 22 at the opposite end of the table 20. Tank 22 which is usually provided with bins (not shown) for receiving casings of different diameter and with pegs 23 around which the trailing ends of the casings may be lapped, to classify them as to length. An arched guide 24 formed of a spring or resilient plate, has one of its sides fixed to the receiving-end of table 20, and is provided with guide-pins 25 for the casing projecting from its upper face. Guide 24 is resilient to permit it to yield in the event the casings become tangled in tank 21 so as to prevent them from being torn.

The invention contemplates manual placement of the leading end of a casing on a core 27 for diameter and length measurement. The core is formed of a hollow tube, one end of which is secured in a T-fitting 28. A pipe-standard 29 has its upper end secured in fitting 28 and is rigidly supported on a vertically movable carriage 30 which is pivoted to swing horizontally for the purpose hereinafter set forth. The free end of hollow core 27 is adapted to receive and fit into the leading end of a casing when the operator connects the casing to the core. A feature of the present invention consists in distending the casing and measuring it internally for its diameter. By measuring the casings internally a more accurate measurement can be made since the variation of the diameters of casings is usually measured in millimeters. The diameter-measuring device in the main form of the invention comprises an arm 32 which is normally disposed in tubular core 27, is pivoted on a cross-pin 33 carried by the core, and is adapted to swing through a longitudinal slot 34 in the core to engage the inside periphery of and distend the casing, as shown in Fig. 1b. A cable 36 extends around a sheave 37 which is fixed to arm 34, has one of its ends connected to take-up spring 35 and its other end to a rod 39 which is connected to operate the diameter-indicator. Rod 39 is slidably guided in a head 40 which is screw-threaded into the inner end of core 27 (Fig. 4). Arm 32 is swung out of the core 27 by a weight 50 which is fixed to one arm of a lever 51 which is provided with a fork adapted to abut against an abutment-nut 52 which is screw-threaded to the rod 39. Weight 50, when released, shifts lever 51 so the latter will press against nut 52 and shift rod 39 outwardly the extent which the casing permits the arm 32 to swing outwardly. Weight 50 is adjustable on rod 39 to vary the outward pressure of arm 32 so it will distend the casing sufficiently for diametric measurement but not excessively. When the lever 51 is free to be shifted by weight 50 (Fig. 4) arm 32 will be operated to distend the casing and measure its diameter. Lever 51 is normally held to render weight 50 inoperative against the force of spring 35 so that the arm 32 will be positioned inside of the core 27 to permit the leading end of a casing to be readily placed around, and the casing to be strung on the core 27 (Fig. 6). The means for holding the lever 51 and weight 50 ineffective to swing arm 32 out of core 27, comprises an angular hand-lever 52 which is fulcrumed at 53 on an upstanding extension of carriage 30. A spring 55 is applied to raise lever 54 and is of sufficient force to swing lever 51 and weight 50 into position to release rod 39 so that spring 35 will retract the arm 32 inside of core 27. Normally, lever 54 engages lever 51 and swings it into position to permit abutment-nut 52 to be retracted by spring 35 and arm 32 to swing into core 27. When a measurement of diameter is to be taken, the leading end of the casing is placed around the core 27 by the operator, as illustrated in Fig. 4. The operator will then depress the free end of lever 54 to release the weight-lever 51 and render it effective to swing arm 32 out of core 37 and against the inside of the casing. The varying range of movement of the rod 39 as controlled by the outward movement of arm 32 responsively to the diameter of the casing, is utilized to operate an indicator for the diametric size.

Rod 39 has fixed to its outer end an arm 40' which reciprocates with rod 39 responsively to the movement of arm 32 in taking a measurement and operates a diameter-indicator. This indicator comprises a casing 41 which is provided with an arcuate opening 42 through which is visible an index-arm 44 which is pivoted on a stud 45 (Fig. 10) which is carried by a plate 46 fixed in casing 41, and a connecting-rod 47 between the index-arm 44 and arm 40'. A screw 48 is applied to the outer end of rod 47 to permit adjustment of the index 44 relatively to the arm 40'. Screw 48 engages one side of a spring-arm 49' carried by arm 40' and a collar 49 engages the other side of arm 49 to adjust the connection for operating the indicator-arm 44. Indicator-casing 41 is fixed to a head 58 which is secured to a tubular standard 59, the lower end of which is fixed in, and is movable with, the pivotally movable carriage 30.

Carriage 30 is vertically reciprocable for the purpose of bringing the casing on the core 27 into position to be drawn onto the core after the leading end of the casing has been placed around the core. For this purpose, standard 59 which carries the indicator-mechanism is vertically slidable on a standard 60, the lower end of which is fixedly secured against rotation and vertical movement in a bracket 61 which depends from table 20. The means for lowering the carriage 30 to bring core 27 into and out of operative relation with a pair of coacting feed-rolls 63, 64, comprises a lever 65 (Fig. 4) which is fulcrumed at 66 and is provided with a forked abutment 67 for engaging the carriage 30 to force it downwardly, a pedal 68, and a link 69 between the pedal and lever 65. A spring 70 confined within the tubular standard 59 is applied to hold the table normally raised and to lift it when pedal 68 is released by the operator. When carriage 30 is to be lowered, the operator will depress pedal 68 and when the pedal is released this carriage 30 will be restored to its raised position by spring 70.

The rolls 63, 64 are driven by power from suitable gearing in a box 71 which is driven from a suitable source of power, such as an electric-motor 108 through a pulley and a belt 71b (Fig. 1). Rolls 63, 64 each have a concave annular groove 72 adapted to receive and fit around one side of the core 27 to engage the casing and feed it forwardly on the core. Normally, the carriage 30 is raised and the core 27 carried thereby is elevated above the feed-rolls 63, 64 so the operator can have access to place the leading end of the casing around the core and in position to be engaged by the feed-rolls. Each feed-roll comprises a peripheral portion of sponge-rubber in which the groove 72 is formed and a metallic hub or bushing 73. The feed-rolls, when engaging the casing around the cylindrical core 27, are pressed against the casing and the cavities in the sponge-rubber produce a suction-effect on the outside of the casing which aids the pressure of the rolls against the casing in positively feeding the casing forwardly on the core 27 and preventing slippage. This has been found to be an important feature in feeding the casing onto the core and more accurately measuring the length of the casing from the feed-rolls.

The gearing in box 71 is connected to drive a pair of vertical shafts 74 at the same speed. Each feed-roll is fixed to a vertical shaft 75 (Figs. 8 and 9). Each shaft 75 is journaled in a bracket 76 which is pivoted to swing horizontally on one of the drive-shafts 74. Shafts 75 are each driven from one of the shafts 74 by a belt-pulley 77 fixed to a shaft 74, a belt-pulley 78 fixed to one of the shafts 75, and a belt 79 between the pulleys on shafts 74, 75, respectively. A spring 80 is applied to brackets 76 to press the feed-rolls 63, 64 against the casing on core 27. Feed-rolls 63, 64 are moved to and from each other to engage and disengage the core with the casing thereon so the core can be lowered into the plane of the grooves 72 of the feed-rolls.

When the rolls are released for horizontal swinging, they are moved together by spring 80 which causes them to grip the casing and core when the latter have been lowered into the horizontal plane of grooves 72 of the feed-rolls. This movement of the feed-rolls is effected automatically with the lowering of carriage 30 and the core 27 by means of lever 65 and inclined cams 81 and 82 on the brackets 86, respectively (Fig. 8). When core 27 and carriage 30 are raised, lever 65 will be raised and will engage and hold apart the upper portions of cams 81, 82 so that rolls 63, 64 will be spread sufficiently to permit the core 27 with the casing thereon to be lowered into the plane of groove 72 of the feed-rolls, as shown by dotted lines in Fig. 8. As the core 27 is lowered into the horizontal plane of the groove 72, lever 65 will permit cams 81, 82 to be moved together by spring 80 so that the feed-rolls will grasp the casing and the core 27 and feed the casing onto the core. When lever 65 is raised upon the release of the pedal 68, by the operator, said lever will engage cams 81, 82 and spread brackets 76 and the feed-rolls to permit the core and casing to clear the feed-rolls and move upwardly into a position above them. Spring 70 in standard 59 (Fig. 10) serves to lift carriage 30 with the core and indicator-mechanism when the pedal 68 is released by the operator. This means exemplifies mechanism for feeding the casing onto the core by power and for vertically separating the feed-rolls so that the core will be free to be swung laterally for convenience in stripping the casing therefrom when the casing has been completely placed around the core. It also exemplifies such means which is adapted to be operated manually in connection with power-driven feed-rolls.

Means is provided for measuring the length of the casing or section thereof which is fed on and around the core 27 during each operation. This mechanism (Figs. 8, 12 and 13) consists of a screw 83 fixed on, and rotating with, one of the feed-roll shafts 75; a semi-cylindrical nut 84 adapted to be engaged by the screw 83; an arm 87 which rests on a fixed bracket 86 and to which nut 84 is fixed; rods 85 on which arm 87 is slidable; a lift-rod 88, the lower end of which extends through an opening in arm 87 and is provided with an abutment-collar 89a adapted to contact arm 87 when carriage 30 is lowered; and an index 89 secured to the upper end of lift-rod 88 and adapted to coact with a vertical series of indications 90 on a plate 91 on the front of indicator-casing 91. When the operator depresses the pedal 68 to lower core 27 and carriage 30 to render the feed-rolls operative on the casing and lever 65 releases the feed-rolls so they will be pressed together by spring 80, screw 83 will move laterally into engagement with the thread on nut 84. So long as the feed-rolls are moving the casing onto the core, nut 84 and screw 83 will remain in engagement and the upward movement of the nut 84 will be proportionate to the length of the casing. After the trailing end of the casing or a cut section thereof is on the core, the operator will release the pedal 68 which will separate the feed-rolls and separate screw 83 from nut 84. Consequently, the lifting movement of rod 88 will be proportionate to the length of the casing and the index 89 will be correspondingly shifted along the length-indications 90 and thereby the operator will ascertain the length of the casing or section which has been previously measured for diameter.

The apparatus includes means for discharging water through the core 27 into the casing between the core 27 and guide 24 for the purpose of making an inspection to discover perforations, defects or leaks in the casing. A rotary valve 100 is included in pipe-standard 29 which supports the core 27. A handle 101 is fixed to the stem of said valve and is located in proximity to the core. Water is supplied to the pipe-standard 29 through a hose-section 102 which is connected to a water-supply pipe 103. A valve 104 is included in the pipe 103. By means of this water connection the operator, after the leading end has been placed around the core 27 can, by depressing lever 101, discharge water in sufficient quantities to distend the portion of the casing between the core 27 and guide 24 for inspection purposes. Hose-section 102 permits the standard 29 to be raised and lowered with carriage 30.

A drum or windlass 105 is secured to rotate with a shaft 106 which is journaled in bearings 107 on table 20. Shaft 106 is driven from electric-motor 71a by means of a pulley 109, belt 110 and pulled 111 (Figs. 1 and 2). Drum 105 is provided with longitudinal ribs 105a. After the portion of the casing between core 27 and guide 24 has been filled with water, the operator will form a loop in that portion of the casing and place the loop endwise onto the drum 105. As a result of looping the casing around the drum, the upper side of the casing between the drum and guide 24 will be readily visible and the casing between the drum 105 and the opposite side of the casing will be inverted to render the opposite side of the casing visible between the drum and the core. The casing loop around the drum will be loose normally so that the drum 105 will rotate idly without pulling the casing from guide 24. As soon as the feed-rolls 63, 64 are applied to the leading end of the casing, the reach of the casing between the core and drum 105 will become taut, whereupon the drum will grip the casing and feed it toward the core.

An upstanding knife 112 is fixed to the top of the table 20 between drum 105 and core 27. When, during the feeding of a casing onto the core by feed-rolls 63, 64, the operator observes a defective section, he will release pedal 68 to stop the feed-rolls 63, 64 and pinch the casing between the core and the knife at two points adjacent the point of the casing at which it is to be severed and press that portion against the upper edge of knife 112, thus severing the casing into sections. The operator will preferably hold the leading end of the casing from the drum 105 to confine water in the section until it is connected to core 27. When a section or a casing has been completely fed onto the core and the pedal 68 has been released to lift the core and the casing above feed-rolls 63, 64, the core with the carriage 30 and the indicating-means thereon, can be swung horizontally by the operator to bring the core away from the table 20 and near or over the classifier trough 22. The spring 70 in standard 59 (Fig. 10) has its ends connected to rotatable head 58 and fixed standard 60, for the purpose of retracting the table 30 to its normal position. A stud 113 is fixed to and projects from hollow standard 69 and said standard is provided with a vertical slot 114 which permits the carriage 30 and the core to be raised and lowered when the core 27 is correspondingly shifted and with a horizontal slot 115 communicating with the lower end of vertical slot 114 which permits carriage 30 to swing only while it is lifted. When the carriage is swung horizontally, core 27 will be brought over the classifier tank 22, as shown in dotted lines in Fig. 1. In such position, the operator can strip the casing from the core and drop a portion of it into the tank 22 while depositing one end thereof between the pins 23 to classify the casings or sections according to length and diameter.

The operation of the apparatus will be as follows: Normally the carriage 30, core 27 and the indicator-mechanism will be in their raised position (Fig. 1). Core 27 will be above the feed-rolls 63, 64 so that the latter will not be effective on a casing on the core. Arm 32 will be in its inoperative position in the hollow core 27, being then held in such position by spring 35. Lever 52ª will then hold the weight 50 so it will be ineffective to shift arm 32. Motor 71 may be continuously operated to drive drum 105 and feed-rolls 63, 64. The latter will be ineffective to feed the casing because the core is raised. The operator will pick one end of a casing from tank 21, place it over the guide 24, under the drum 105 and connect its leading end to core 27. The operator will then depress lever 101 to open valve 100 and deliver water from standard 29 through core 27 into the casing for the purpose of distending it for inspection and for determining any leaks or perforations therein. When the desired quantity of water has been fed into the casing, the operator will shift lever 101 to close valve 100. Next, the operator will form a loop in the casing between guide 24 and core 27 and place the loop around drum 105 (Fig. 1) thus forming two drooped loops in the casing, one between guide 24 and drum 105 and the other between the drum and core 27. Leaks or defects in the casing can be observed in the upper half of the casing between guide 24 and drum 105 and between said drum and the core 27 and the leaks in the other half of the casing can be observed where it passes over the drum 105. In this manner, the operator is enabled to inspect substantially all portions of the casing as it passes between guide 24 and the core 27. The casing will be loose around drum 105 at this time so that it will not draw the casing from guide 24.

Next, the operator will depress lever 52ª against the force of spring 55. This will release lever 51 for movement by weight 50. Lever 51 will shift abutment 52 outwardly to operate rod 39 and cable 36 to swing arm 32 outwardly from the core 27 until the outer end of arm 32 is arrested by the casing (Fig. 4). The range of movement of arm 32 will vary with the diameter of the casing. Rod 39 will shift arm 40', rod 47 and index-arm 44 to indicate the diameter of the casing on scale 43. The operator will then have ascertained the diameter of the casing for classification.

Next, the operator will release lever 52ª, whereupon spring 35 will retract rod 39, arm 40' and index-arm 44 and arm 32 into their normal position.

Next, the operator will depress pedal 68 to operate lever 65 and lower carriage 30 and core 27 into position to render the feed-rolls operative to draw the casing onto the core (Fig. 6). As lever 65 is lowered, it will act on cams 81, 82 to permit the feed-rolls 63, 64 to be brought together and engage the casing on the core and feed and string it onto the core until its trailing end passes the feed-rolls. When the trailing end of the casing or a section cut therefrom has been strung onto the core, the operator will release pedal 68 and permit spring 70 in hollow standard 59 to lift carriage 30, the indicator-mechanism carried thereby and the core. Simultaneously lever 65 will spread the feed-rolls to release the core 27.

During the engagement of the feed-rolls with the casing, screw 83 on one of the feed-roll shafts 75 will be positioned so it will engage nut 84 and raise the nut, arm 87 and rod 88 according to the duration of the engagement of the feed-rolls with the casing and correspondingly to its length. Rod 88 will operate index 89 to indicate the length on the length-scale 90. Thereby the operator will determine the length of the casing.

When the carriage 30 is raised, core 27 will be above the feed-rolls where it will have clearance to be swung horizontally into position over classifier tank 22.

The operator will then swing the core 27 into position shown by dotted lines in Fig. 2 and strip the casing from the core and place one end of it in tank 22 and its other end between the pegs 23, according to their diameter and length. After the casing has been stripped from the core, the latter will be swung back into its normal position above table 20 by the torsional effect of spring 70 and the apparatus will be in readiness for the commencement of another operation.

If, during the feeding of a casing onto the core, the operator observes a leak or a defective portion in the casing, the pedal 68 will be released to disengage the casing from the feed-rolls to stop the advance of the casing onto the core. The operator will then grasp the casing at two points adjacent the portion to be cut and draw that portion over the knife 112 to sever the casing at proper points to cut off the defective strip. The core will then be swung into position over the classifier tank and the casing-section stripped from the core and classified in the tank while the leading end of the next usable portion of the casing will be connected to the core and measured as heretofore.

In the modified form of the diameter-measuring device shown in Fig. 3, the rod 39 has an extension 39ª, is guided longitudinally in the core 27ª, and carries a head 39ᵇ. Resilient bowed strips 39ᶜ are attached to said head and to the core 27ª. When the weight 50 is released by lever 52 to apply endwise force to stem 39 and its extension 39ª, the strips 39ᶜ will be spread within the limits permitted by the diameter of the casing to operate the indicator-arm 44 accordingly.

A series of differently colored paddles 116 are pivotally mounted in the indicator-casing and may be used to aid the operator in reading the diametric measurements or may be shifted to register the measurement. These paddles are manually shiftable so that when a change in diameter occurs, and the operator stops the feed mechanism to sever the intestine at the point of change, he can move all the paddles, except the one under the pointer 44 to the zero point so that the remaining paddle will retain the indication for the measurement at the change, as a visible reference for the distribution of the severed portion with its correct bin.

After the operator has closed valve 100 and during the feeding of the intestine onto the core 27, the ribs 105ª on drum 105, which rotates in the direction indicated by the arrow in Fig. 1 and is driven so it has a surface-speed much greater than that of the intestine, will pump water from the trailing portion of the casing and keep the portion of the casing a between the drum and the core distended so that the operator can readily observe leaks in the portion of the casing between the drum and the core.

The invention exemplifies means for measuring the diameter of the intestine, by which a predetermined pressure will be applied to element 32, by weighted lever 51, to expand the intestine, and by which the pressure will be limited so that the intestine will not be torn or injured. By adjusting the weight 50 to or from the fulcrum of lever 51, this predetermined pressure may be varied according to the thickness of the wall of the intestine, so that when thin or weak casings are being measured, there will be no excessive pressure exerted by the element 32 and, when intestines having a thick wall are being measured, sufficient pressure may be applied to element 32 to expand the intestine for a correct diametrical measurement.

By the use of power-driven feed-rolls 63 the intestine may be quickly drawn onto the core and the diameter measuring is expedited, because the device is operative to measure the different portions of the intestine while it is being fed onto the core. This greatly expedites the measuring of the different portions of an intestine.

In practice it has been found that when feed-rolls 63 are formed of sponge rubber pressed against the sides of the casing, the air is expelled from the spaces in the rubber and produces suction in the cells in the rolls where they engage the intestine and the effect of this is to cause the rolls to grip the intestine without slippage and without tending to tear it. The use of a pair of feed rolls engaging opposite sides of the intestine by means of spring pressure also contributes to the effective gripping and advance of the intestine without tending to tear it.

By mounting the indicating mechanism on a carriage which moves vertically with the core when the core is raised and lowered into position to put the feed rolls into and out of operative relation to the core, it becomes unnecessary to provide an indicator operating connection which permits relative movement of the indicator and the core which carries the element 32.

The invention exemplifies a casing measuring and inspecting machine in which power is used to expedite the feed of the casing while the diametrical and length measurements are readily ascertained and indicated to the operator for classification without the use of complicated mechanism for automatically distributing the casings or sections thereof according to diameters and lengths.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In apparatus of the character described, the combination of a core adapted to extend into an intestine, means associated with and for feeding the intestine onto the core, means for pivotally supporting the core to swing laterally away from the feed-means to bring it into position for stripping the intestine from the core, and means for measuring the diameter of the casing while it is being fed on the core.

2. In apparatus of the character described, the combination of a core adapted to extend into an intestine, means associated with and for feeding the intestine onto the core, means for pivotally supporting the core to swing laterally away from the feed-means to bring it into position for stripping the intestine from the core, and means for measuring the diameter of the intestine, mounted to swing with the core.

3. In apparatus of the character described, the combination of a core adapted to extend into and support an intestine so it can be distended outwardly and expanded, intestine-distending means carried by the core and movable to variably distend intestines outwardly from the core according to diametrical size, the intestine being free to be distended by the distending-means according to the size of the intestine, the movement of the distending-means being automatically limited by the inherent distensibility of the intestine, and means for indicating the diametrical size of the intestine responsively to the movement of said means.

4. In apparatus of the character described, the combination of a core adapted to extend into and support an intestine so it can be distended outwardly and expanded, variable-pressure intestine-distending means carried by the core and adapted to variably distend intestines outwardly from the core and according to diametrical size, the intestine being free to be distended by the distending-means according to the size of the intestine, the movement of the distending-means being determined by the inherent distensibility of the intestine, and means for indicating the diametrical size of the intestine responsively to the movement of said means.

5. In apparatus of the character described, the combination of a core adapted to extend into and support an intestine so it can be distended outwardly and expanded, intestine-distending means carried by the core and adapted to variably distend intestines outwardly from the core and according to diametrical size, the intestine being free to be distended by the distending means according to the size of the intestine, the movement of the distending-means being determined by the inherent distensibility of the intestine, manually-controlled means for rendering inoperative the distending means, and means for indicating the diametrical size of the intestine responsively to the movement of said means.

6. In apparatus of the character described, the combination of a core adapted to extend into and support an intestine so it can be distended outwardly and expanded, weight-shifted intestine-distending means carried by the core and adapted to variably distend intestines outwardly from the core and according to diametrical size, the intestine being free to be distended by the distending-means according to the size of the intestine, the movement of the distending-means being determined by the inherent distensibility of the intestine, and means for indicating the diametrical size of the intestine responsively to the movement of said means.

7. In apparatus of the character described, the combination of a core adapted to extend into and support an intestine so it can be distended outwardly, an intestine-distending element carried by the core and movable to variably distend intestines outwardly from the core according to diametrical size, means for pressing said element to distend the intestine, the intestine being free to be distended by said element according to the size of the intestine, the extent of movement of said element being automatically limited by the inherent distensibility of the intestine, and means for indicating the diametrical size of the intestine responsively to the movement of said element.

8. In apparatus of the character described, the combination of a core adapted to extend loosely into and support an intestine so it can be distended outwardly, an intestine-distending element carried by the core and movable to variably distend intestines outwardly from the core according to diametrical size, a weight for pressing said element to distend the intestine, the intestine being free to be distended by said element according to the size of the intestine, the movement of said element being automatically limited by the inherent distensibility of the intestine, and means for indicating the diametrical size of the intestine responsively to the movement of said element.

9. In apparatus of the character described, the combination of a core adapted to extend loosely into and support an intestine so it can be distended outwardly, a pivoted intestine-distending element carried by the core and movable to variably distend intestines outwardly from the core according to diametrical size, means for pressing said element to distend the intestine, the intestine being free to be distended by said element according to the size of the intestine, the movement of said element being automatically limited by inherent distensibility of the intestine, and means for indicating the diametrical size of the intestine responsively to the movement of said element.

10. In apparatus of the character described, the combination of a core adapted to extend loosely into and support an intestine so it can be distended outwardly, a pivoted intestine-distending element carried by the core and movable to variably distend intestines outwardly from the core according to diametrical size, a weight for pressing said element to distend the intestine, the intestine being free to be distended by said element according to the size of the intestine, the movement of said element by the weight being automatically limited by inherent distensibility of the intestine, and means for indicating the diametrical size of the intestine responsively to the movement of said element.

11. In apparatus of the character described, the combination of a core adapted to extend loosely into and support an intestine so it can be distended outwardly, means for engaging the intestine and feeding it onto and around the core, comprising means for pressing the feed-means against the intestine on the core, variable pressure intestine-distending means carried by the core and movable to variably distend intestines outwardly from the core according to diametrical size, while the intestine is being fed onto the core, the intestine being free to be distended by the distending means according to the size of the intestine, the movement of the distending-means being automatically limited by the inherent distensibility of the intestine, and means for indicating the diametrical size of the intestine responsively to the movement of said element.

12. In apparatus of the character described, the combination of a core adapted to extend loosely into and support an intestine so it can be distended outwardly, means for engaging the intestine and feeding it onto and around the core, comprising means for pressing the feed-means against the intestine on the core, intestine-distending means carried by the core and movable to variably distend intestines outwardly from the core according to diametrical size while the intestine is fed onto the core, the intestine being free to be distended by the distending-means according to the size of the intestine, the movement of the distending-means being automatically limited by the inherent distensibility of the intestine, manually controlled devices for rendering inoperative the feed-means and the distending-means, and means for indicating the diametrical size of the intestine responsively to the movement of said element.

13. In apparatus of the character described, the combination of a core adapted to extend loosely into and support an intestine so it can be distended outwardly, means for engaging the intestine and feeding it onto and around the core, comprising means for pressing the feed-means against the intestine on the core, weight-shifted intestine-distending means carried by the core and movable to variably distend intestines outwardly from the core according to diametrical size while the intestine is being fed onto the core, the intestine being free to be distended by the distending-means according to the size of the intestine, the movement of the distending-means being automatically limited by the inherent distensibility of the intestine, and means for indicating the diametrical size of the intestine responsively to the movement of said element.

14. In apparatus of the character described, the combination of a core adapted to extend into and support an intestine so it can be distended outwardly, means for feeding the intestine onto and around the core, means for removably supporting the core so as to bring it into and out of operative relation with the feed-means, an element carried by the core and movable to variably distend intestines outwardly from the core according to diametrical size, means for applying pressure to said element to distend the intestine, the intestine being free to be distended by said element according to the size of the intestine, the movement of said element being automatically limited by the inherent distensibility of the intestine, and an indicator connected to said element for indicating the diameter of the casing on the core, said pressure-means being movable with and mounted on the core-supporting means.

15. In apparatus of the character described, the combination of a core adapted to extend into and support an intestine so it can be distended outwardly, means for feeding the intestine onto and around the core, means for pivotally supporting the core to swing it into and out of operative relation with the feed-means, an outwardly movable element carried by the core and movable to variably distend intestines outwardly from the core according to diametrical size, means for applying pressure to said element to distend the intestine, the intestine being free to be distended by said element according to the size of the intestine, the movement of said element being automatically limited by the inherent distensibility of the intestine, and an indicator connected to said element for indicating the diameter of the casing on the core, said pressure-means and indicator being movable with and mounted on the core-supporting means.

FRANK G. LEAVENWORTH.